United States Patent
Velasco (10) Patent No.: US 9,811,673 B2
(45) Date of Patent: *Nov. 7, 2017

(54) CONTENT OBJECT ENCAPSULATING CONTENT ITEMS FOR ACCESSING CONTENT AND ACCESS AUTHORIZATION INFORMATION

(75) Inventor: Marc B. Velasco, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 13/004,853

(22) Filed: Jan. 11, 2011

(65) Prior Publication Data

US 2012/0180111 A1     Jul. 12, 2012

(51) Int. Cl.
G06F 15/173     (2006.01)
G06F 21/62     (2013.01)
H04L 29/08     (2006.01)
H04L 29/06     (2006.01)

(52) U.S. Cl.
CPC .......... *G06F 21/62* (2013.01); *G06F 21/6209* (2013.01); *G06F 21/6245* (2013.01); *H04L 29/08072* (2013.01); *H04L 63/101* (2013.01); *H04L 63/105* (2013.01)

(58) Field of Classification Search
CPC ......... G06F 17/30849; G06F 17/30861; G06F 17/30864; G06F 17/3087; G06F 17/30873
USPC .......................................................... 726/28
See application file for complete search history.

(56) References Cited

U.S. PATENT DOCUMENTS

| 5,878,421 A | * | 3/1999 | Ferrel et al. |
| 7,024,556 B1 | * | 4/2006 | Hadjinikitas ....... H04L 63/0815 709/225 |
| 7,475,336 B2 | * | 1/2009 | Fujiwara ..................... 715/230 |
| 7,496,563 B2 | * | 2/2009 | Newbold et al. |

(Continued)

OTHER PUBLICATIONS

Costa, G.CV., A. Jain, D. Khandelwal, S. Okamoto, D. Peter, S. Peters, M. Santana, and C. Tchong, "Customizing Lotus Quickr 8.1", Jan. 14, 2009, 203 pp.

(Continued)

*Primary Examiner* — Scott B Christensen
(74) *Attorney, Agent, or Firm* — David W. Victor; Konrad, Raynes, Davda and Victor LLP (57) ABSTRACT

Provided are a method, system, and computer program product for a content object encapsulating content items for accessing content and access authorization information. User input of content items is received, wherein each content item indicates a network address and content type of content at the network address. The content items are added to a content object in a computer readable storage. User input is received of access authorization information indicating a user having authority to access the content object. The access authorization information is added to the content object. A user request is received for the content object from a client computer over a network. The access authorization information is processed to determine whether the user at the client computer initiating the request has authorization to access the content object. The content object is processed to generate a presentation page to return to the client computer in response to determining that the user of the client computer is authorized to access the content object.

18 Claims, 9 Drawing Sheets

(56) References Cited

U.S. PATENT DOCUMENTS

| | | | |
|---|---|---|---|
| 7,627,652 B1* | 12/2009 | Commons | H04L 67/1097 709/213 |
| 7,962,634 B2* | 6/2011 | Cortos et al. | 709/229 |
| 8,161,411 B2 | 4/2012 | Robbin et al. | |
| 8,799,249 B2* | 8/2014 | Martinez | G06F 17/30038 707/705 |
| 2003/0005455 A1 | 1/2003 | Bowers | |
| 2004/0117820 A1* | 6/2004 | Thiemann | H04N 7/17318 725/37 |
| 2004/0177319 A1* | 9/2004 | Horn | G06F 17/3002 715/205 |
| 2004/0230655 A1* | 11/2004 | Li et al. | 709/205 |
| 2005/0022229 A1* | 1/2005 | Gabriel et al. | 725/28 |
| 2005/0278333 A1 | 12/2005 | Daniels et al. | |
| 2006/0041830 A1 | 2/2006 | Bohn | |
| 2006/0161635 A1* | 7/2006 | Lamkin | G06F 17/30041 709/217 |
| 2006/0286526 A1 | 12/2006 | Montgomery et al. | |
| 2007/0073701 A1 | 3/2007 | Miller et al. | |
| 2007/0073728 A1* | 3/2007 | Klein et al. | 707/10 |
| 2007/0124382 A1* | 5/2007 | Hughes | H04L 12/1822 709/205 |
| 2007/0288426 A1 | 12/2007 | Schachter | |
| 2008/0021921 A1 | 1/2008 | Horn | |
| 2008/0077635 A1* | 3/2008 | Sporny et al. | 707/204 |
| 2008/0207182 A1* | 8/2008 | Maharajh et al. | 455/414.1 |
| 2009/0019369 A1 | 1/2009 | Borovsky et al. | |
| 2009/0165140 A1* | 6/2009 | Robinson | G06Q 30/02 726/26 |
| 2009/0187657 A1* | 7/2009 | Uemitsu | 709/225 |
| 2009/0216769 A1* | 8/2009 | Bellwood et al. | 707/9 |
| 2009/0260060 A1* | 10/2009 | Smith et al. | 726/3 |
| 2009/0328063 A1* | 12/2009 | Corvera et al. | 719/315 |
| 2010/0127013 A1* | 5/2010 | Butler | 221/1 |
| 2010/0131524 A1 | 5/2010 | Baran | |
| 2010/0223570 A1 | 9/2010 | Gerstl et al. | |
| 2010/0257449 A1 | 10/2010 | Lieb et al. | |
| 2010/0269062 A1 | 10/2010 | Kobylinski | |
| 2010/0318500 A1 | 12/2010 | Murphy et al. | |
| 2012/0159337 A1 | 6/2012 | Travilla et al. | |
| 2014/0033047 A1* | 1/2014 | Poling | G06F 3/048 715/730 |
| 2014/0375550 A1* | 12/2014 | Unno | G06F 8/73 345/156 |

OTHER PUBLICATIONS

Hupfer, S., L. Cheng, S. Ross, & J. Patterson, "Reinventing Team Spaces for a Collaborative Development Environment", Submitted to: "Beyond Threaded Conversation" Workshop, CHI 2005, Apr. 2005, 3 pp.

IBM Corporation, "User's Guide: Services for Lotus Domino", First Edition, IBM Lotus Quickr Version 8.0, 2007, 160 pp.

Seshasai, S., and J. Bergland, "Integrating Team Workplace (Quickplace) with Workplace", IBM Redbooks Paper, 2005, 24 pp.

Preliminary Amendment, Jun. 28, 2012, for U.S. Appl. No. 13/536,554, filed Jun. 28, 2012 by M.B. Velasco, Total 8 pp.

U.S. Appl. No. 13/536,554, filed Jun. 28, 2012, entitled "Content Object Encapsulating Content Items for Accessing Content and Access Authorization Information" invented by Valasco, M.B., Total 34 pp.

International Search Report & Written Opinion, May 3, 2012, for PCT/IB2012/050050, Total 9 pp.

US Patent Application, dated Jun. 28, 2012, for U.S. Appl. No. 13/536,554, filed Jun. 28, 2012 by inventor M.B. Velasco et al., Total 31 pages.

Preliminary Amendment, dated 6/28/12, for U.S. Appl. No. 13/536,554, filed Jun. 28, 2012 by inventor M.B. Velasco et al., Total 8 pages.

Ofice Action, dated Jan. 13, 2016, for U.S. Appl. No. 13/536,554, filed Jun. 28, 2012, invented by Marc B. Velasco et al., Total 38 pages.

Response to Office Action, dated Apr. 22, 2016, for U.S. Appl. No. 13/536,554, filed Jun. 28, 2012, invented by Marc B. Velasco et al, Total 9 pages.

* cited by examiner

CONTENT OBJECT ENCAPSULATING CONTENT ITEMS FOR ACCESSING CONTENT AND ACCESS AUTHORIZATION INFORMATION

BACKGROUND OF THE INVENTION

1. Field of the Invention

The present invention relates to a method, system, and computer program product for a content object encapsulating content items for accessing content and access authorization information.

2. Description of the Related Art

Content management systems allow users to organize and secure data, and provide a framework for a large number of people to collaborate and share stored data and control access to data, based on user roles (defining which information users or user groups can view, edit, publish, etc.). Content management systems often provide a hierarchical and structured manner for organizing information, and may use databases and other tools to manage information and content from different sources and provide security. Information may be gathered from Internet web sites to share in the content management system. Content management systems may allow users to share content and publish documents for use by other users in the environment.

There is a need in the art for improved techniques for gathering and sharing content, and securing content.

SUMMARY

Provided are a method, system, and computer program product for a content object encapsulating content items for accessing content and access authorization information. User input of content items is received, wherein each content item indicates a network address and content type of content at the network address. The content items are added to a content object in a computer readable storage. User input is received of access authorization information indicating a user having authority to access the content object. The access authorization information is added to the content object. A user request is received for the content object from a client computer over a network. The access authorization information is processed to determine whether the user at the client computer initiating the request has authorization to access the content object. The content object is processed to generate a presentation page to return to the client computer in response to determining that the user of the client computer is authorized to access the content object.

DETAILED DESCRIPTION

Figure 1:
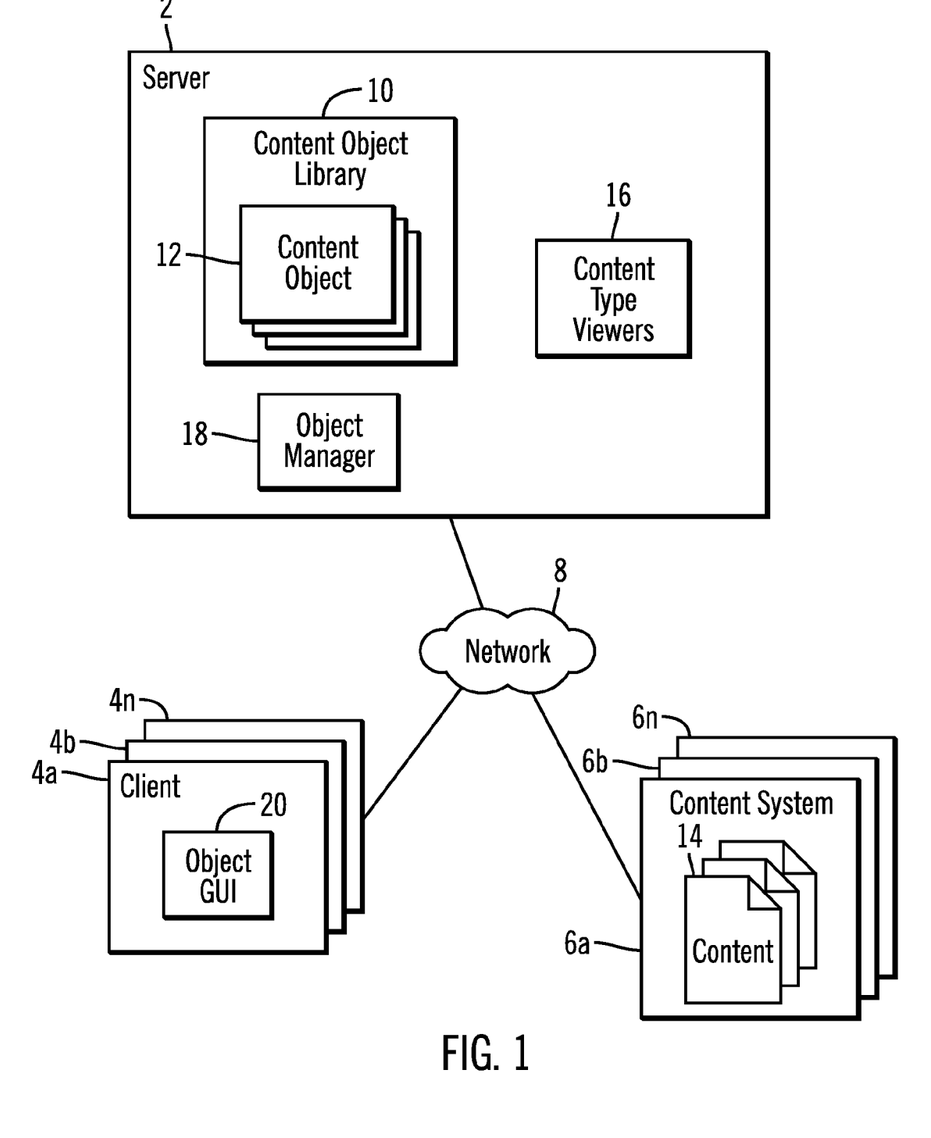
FIG. 1 illustrates an embodiment of a network computing environment.

FIG. 1 illustrates an embodiment of a computing environment. A server 2, multiple client computers 4a, 4b . . . 4n, and content systems 6a, 6b . . . 6n communicate over a network 8. The server 2 includes a content object library 10 of content objects 12 created in response to input received from the client computers 4a, 4b . . . 4n indicating content 14 in the content systems 6a, 6b . . . 6n. The content 14 may be identified by a network address, such as a Uniform Resource Locator (URL). The server 2 further includes content type viewers 16 comprising applications having the capability to render content 12 in different content type formats. An object manager 18 manages content objects 12 in the content object library 10 and manages client 4a, 4b . . . 4n requests with respect to the content objects 12 in the content object library 10.

The clients 4a, 4b . . . 4n include an object graphical user interface (GUI) 20 capable of rendering pages through which the clients 4a, 4b . . . 4n communicate with the server 2 and create, edit, delete, and request content objects 10. The object GUI 20 may comprise a proprietary GUI or may comprise a general GUI, such as a web browser to render pages from the server 2 in pages having a format such as Hypertext Markup Language (HTML), Extended Markup Language (XML), etc. In such embodiments, the object manager 18 may include a web server, e.g., Hypertext Transport Protocol (HTTP) server, to receive and process pages in HTML or XML from the clients 4a, 4b . . . 4n with respect to content objects 10.

The object manager 18 may be implemented as one or more software programs executed by a processor of the server 2. In an alternative embodiment, the object manager 18 may be implemented with hardware logic, such as an Application Specific Integrated Circuit (ASIC).

The reference letter "n" used to denote a number of items may comprise any integer number of items and may denote different numbers of items when used with different elements, such as there may be a different or same number of content systems 6a, 6b . . . 6n and clients 4a, 4b . . . 4n.

The network 8 may comprise a Local Area Network (LAN), Storage Area Network (SAN), Wide Area Network (WAN), wireless network, the Internet, etc. The server 2, clients 4a, 4b . . . 4n, and content systems 6a, 6b . . . 6n may comprise an enterprise storage server, storage controller, blade server, general purpose server, desktop computer, workstation, telephony device, personal digital assistant (PDA), etc., or other computing device.

The server 2, clients 4a, 4b . . . 4n, and content systems 6a, 6b . . . 6n may be implemented in a distributed storage environment or network storage environment, such as "cloud" storage, to provide content management services to clients 4a, 4b . . . 4n in the cloud. Alternatively, the clients 4a, 4b . . . 4n and server 2 may comprise software or a combination of software and hardware components in a same system, such as separate programs executing in a same memory.

Figure 2:
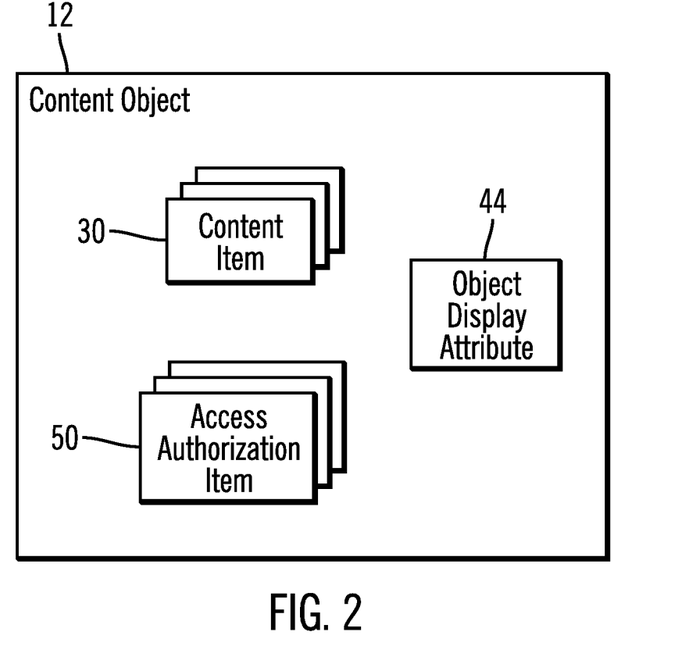
FIG. 2 illustrates an embodiment of a content object.

FIG. 2 illustrates an embodiment of a content object 12 as a data structure encapsulating one or more content items 30 and one or more access authorization items 50. The content object 12 may further include an object display attribute 44 indicating how to display accessed content indicated in content items 30 in a presentation page, such as in multiple frames, in a single scrollable page, or in tabbed pages. If the user does not specify an object display attribute 44, then the accessed content may be rendered in a presentation page in a default display format.

Figure 3:
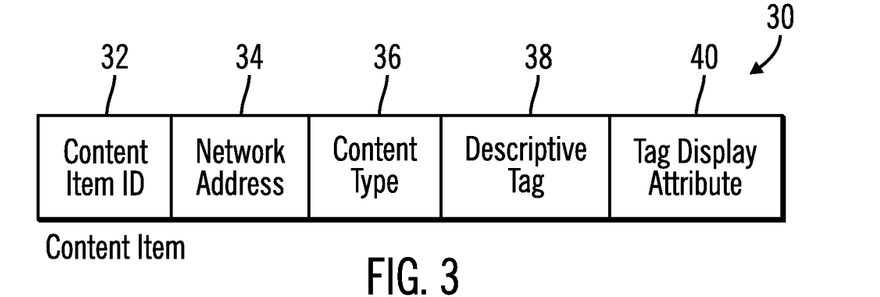
FIG. 3 illustrates an embodiment of a content item in the content object.

FIG. 3 illustrates an embodiment of a content item 30 as including a content item identifier (ID) 32, a network address 34 of the content 14 represented by the content item 30, such as a URL, File Transfer Protocol (FTP) address, Internet Protocol (IP) address, etc., a content type 36 of the content, e.g., such as an identifier of the application that generated and is capable of rendering the content, one or more descriptive tags 38 providing user descriptions of the content 14, and a tag display attribute 40 indicating how to render the accessed content associated with a descriptive tag in a presentation page to return to the clients 4a, 4b . . . 4n. Information such as the descriptive tag 38 and tag display attribute 40 may not be provided for certain content items. The tag display attribute 40 may be maintained outside the content items 30.

Figure 4:
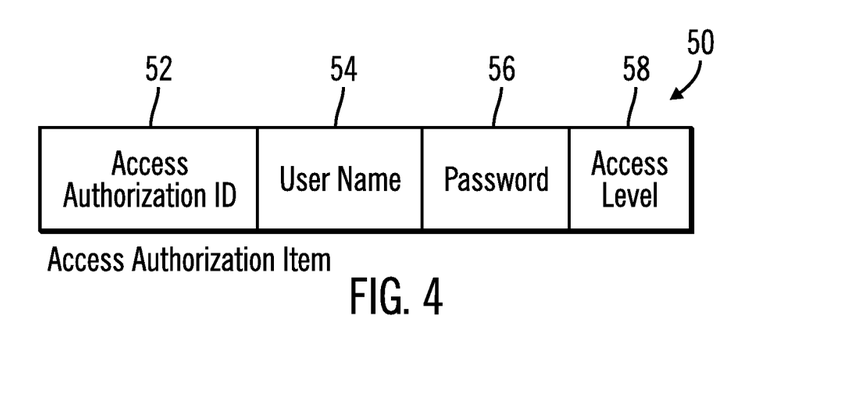
FIG. 4 illustrates an embodiment of an access authentication item in the content object.

FIG. 4 illustrates an embodiment of an access authorization item 50 as including an access authorization identifier (ID) 52, a user name 54 and password 56 for a user authorized to access the content object 12 in which the access authorization item 50 is encapsulated, and an access level 58. The access level 58 may indicate the user has only read-only or view access, editor access to edit items in the content object 12, or owner access, indicating the user may delete or perform any operation with respect to the content object.

The information in the content item 30 and access authorization item 50 data structures may be stored in different data structures having a different arrangement and layout than that shown in FIGS. 3 and 4.

Figure 5:
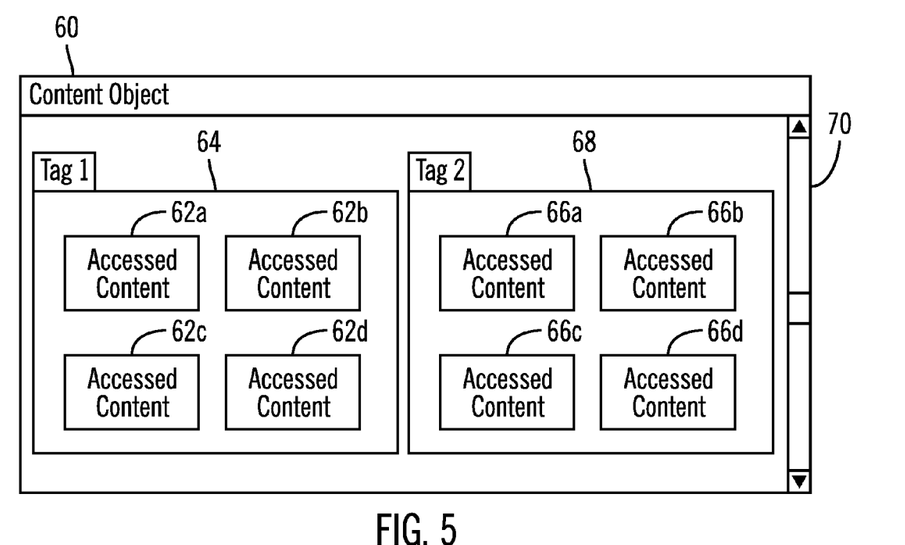
FIGS. 5 and 6 illustrate embodiments of a presentation page providing accessed content from a content object.

FIG. 5 illustrates an embodiment of a presentation page 60 produced by the object manager 18 to return to one of the clients 4a, 4b . . . 4n requesting to view a content object. In FIG. 5, the presentation page 60 organizes accessed content 62a, 62b, 62c, 62d indicated in content items 30 having a first descriptive tag, "tag 1", in a window frame 64 for the first descriptive tag and organizes accessed content 66a, 66b, 66c, 66d indicated in content items 30 having a second descriptive tag, "tag 2", in a window frame 68 for the second descriptive tag. In this way, accessed content 14, accessed from network addresses, for content items 30 having a particular descriptive tag 38 are rendered as grouped together in a same region of the presentation page 60 or in a same window frame, such that there may be multiple frame layouts for accessed content associated with different descriptive tags. This layout presentation for content associated with particular descriptive tags 38 may be indicated in the tag display attribute 40, which may indicate which descriptive tags are associated with a particular tabbed panel or frame or layout position in the page.

Figure 6:
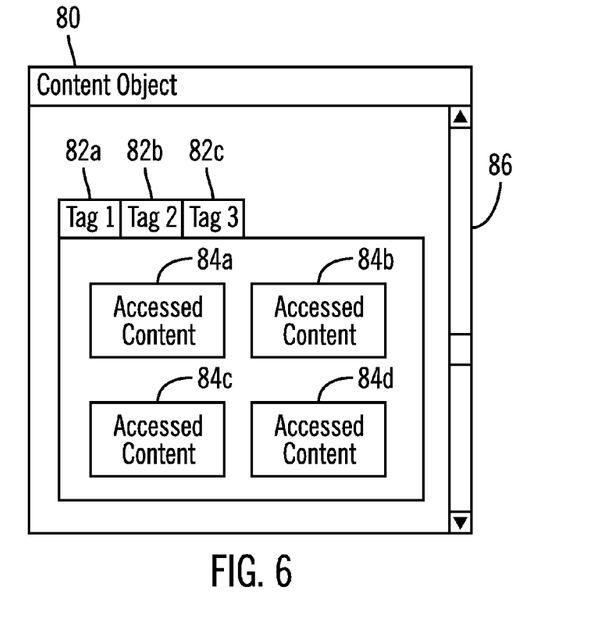

FIG. 6 illustrates an embodiment of a presentation page 80 employing a tab layout, such that each tab 82a, 82b, 82c provides a window displaying accessed content associated with a particular descriptive tag associated with the tab 82a, 82, 82c. For instance, the tab 82a associated with descriptive "tag 1" renders accessed content 84a, 84b, 84c, 84d associated with the descriptive "tag 1". As mentioned, the tag display attribute 40 may indicate the association with content for a particular descriptive tag and a tabbed panel.

The presentation pages 60 and 80 have scroll bars 70 and 86, respectively, to allow the user to scroll the pages 60 and 80 to view further accessed content.

The object display attribute 44 may indicate to display all content in frames, tabbed panes or a single scrolling window of content. Further, the tag display attribute 40 may provide display attributes associated with descriptive tags to display the accessed content for the descriptive tag in the manner provided by the display attribute 40 for that tag. For instance, the tag display attribute 40 may indicate to display accessed content associated with a particular descriptive tag 38 in a frame for the descriptive tag or in a region of the presentation page.

The accessed content 14 may comprise different types of content, such as an image, video, text, web pages, documents, Really Simple Syndication (RSS) feeds, etc.

In certain embodiments, the object manager 18 may use the content type viewers 16 to render the accessed content, accessed from network addresses 34 in content items 30, and then transform the content to a common format to render in the presentation page 60, 80, such as a Tagged Image File Format (TIFF) file, etc. If the accessed content 14 comprises a video stream, then the rendered accessed content in the presentation page 60, 80 may comprise a video player frame showing a first frame of the video and enabling the user to stream the video content from the network address 34 into the video player frame in the presentation page 60, 80.

Figure 7:
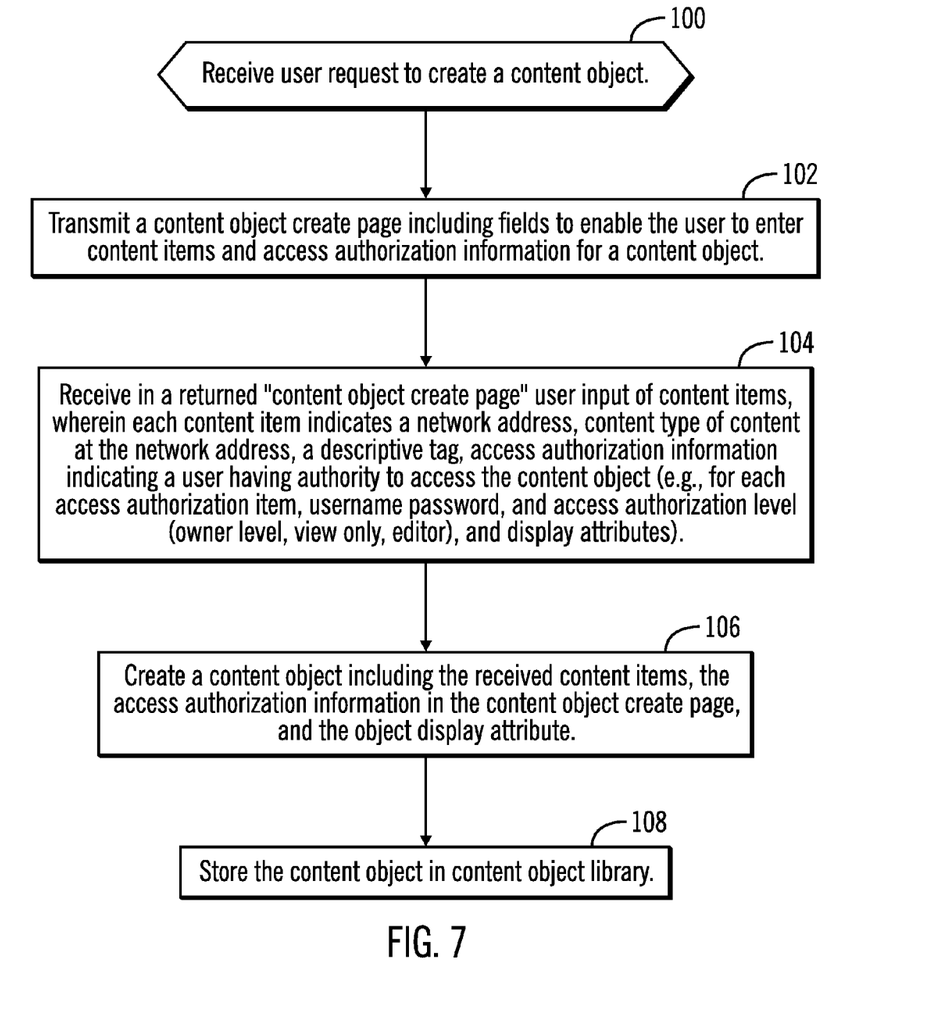
FIG. 7 illustrates an embodiment of operations to create a content object.

FIG. 7 illustrates an embodiment of operations performed by the object manager 18 to enable a client 4a, 4b . . . 4n through the object GUI 20 to create a content object 12. In response to receiving (at block 100) a user request to create a content object 12, the object manager 18 transmits (at block 102) a content object create page including fields to enable the user of the requesting client 4a, 4b . . . 4n to enter content items 30, access authorization items 50, and object display attributes 44 for the content object 12 to create. The object manager 18 then receives (at block 104) in a returned content object create page user input of content items 30, wherein each content item 30 indicates a network address 34, content type 36 of content at the network address 34, a descriptive tag 38, access authorization information 50 indicating a user having authority to access the content object (e.g., for each access authorization item, username password, and access authorization level (owner level, view only, editor), and a tag display attribute 40 for the entire presentation page or for accessed content associated with a particular descriptive tag. The received input may further include the object display attribute 44. The object manager 18 creates (at block 106) a content object 12 including the received content items 30, the access authorization information 50 in the content object create page, and the object display attribute 44, if any. The created content object 12 is then stored (at block 108) in the content objet library 10.

Figure 8:
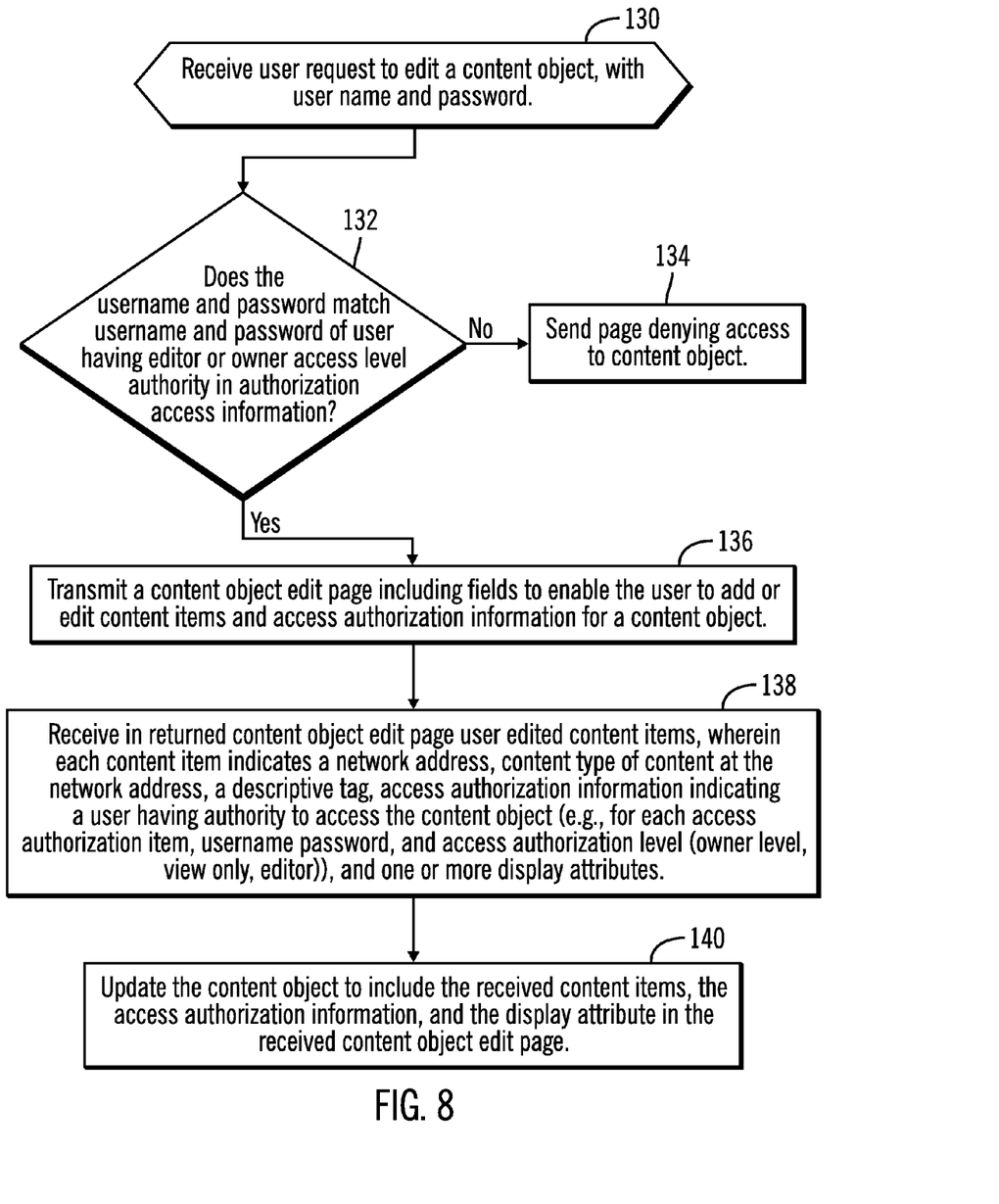
FIG. 8 illustrates an embodiment of operations to edit a content object.

FIG. 8 illustrates an embodiment of operations performed by the object manager 18 to enable a client 4a, 4b . . . 4n through the object GUI 20 to edit a content object 12. In response to receiving (at block 130) a user request from one of the client computers 4a, 4b . . . 4n to edit a content object 12 in the library 10, with a user name and password, the object manager 18 determines (at block 132) whether the username and password, provided with the request, match a username 54 and password 56 of an access authorization item 50 providing editor or owner access level authority 58 for the requested content object 12. If (at block 132) there is no match for authentication, then the object manager 18 sends (at block 134) a page indicating that access to the content object is denied. If (at block 132) there is a match, then the object manager 18 transmits (at block 136) a content object edit page including fields to enable the user to add or edit content items 30, access authorization information 50, and the object display attribute 44 for the requested content object 12. The object manager 18 may then receive (at block 138) a returned content object edit page having user edited content items 30, wherein each content item 30 indicates a network address 34, content type 36 of content at the network address 34, a descriptive tag 38, access authorization information 50 indicating a user having authority to access the content object (e.g., for each access authorization item 50, username 54, password 56, and access authorization level 58 (owner level, view only, editor)), and one or more object 44 and tag 40 display attributes. The object manager 18 updates (at block 140) the content object 12 to include the received content items 30, the access authorization information 50, and the display attribute 40 in the received content object edit page.

Figure 9A:
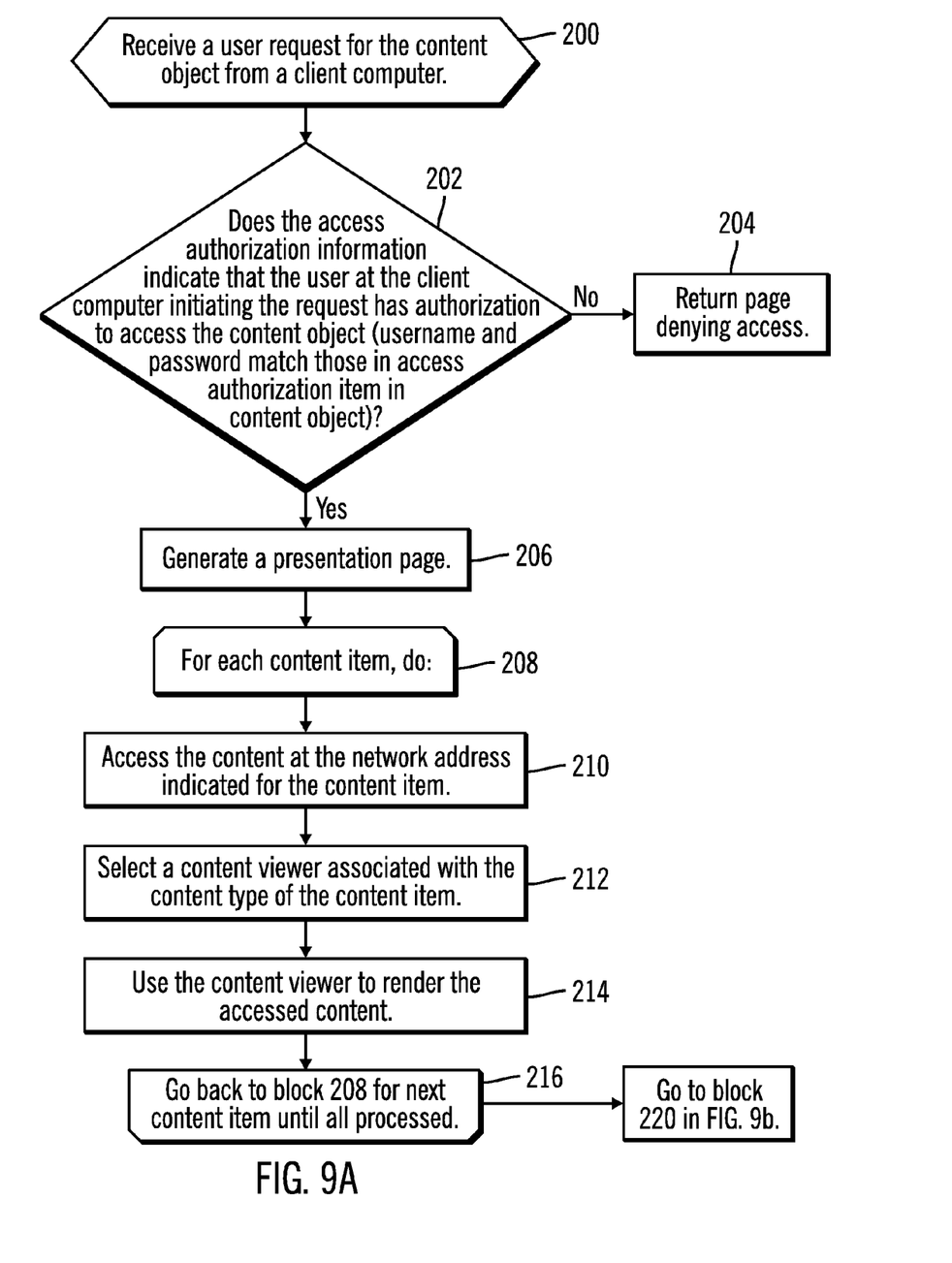
FIGS. 9a and 9b illustrate an embodiment of operations to generate a presentation page from a content object.
Figure 9B:
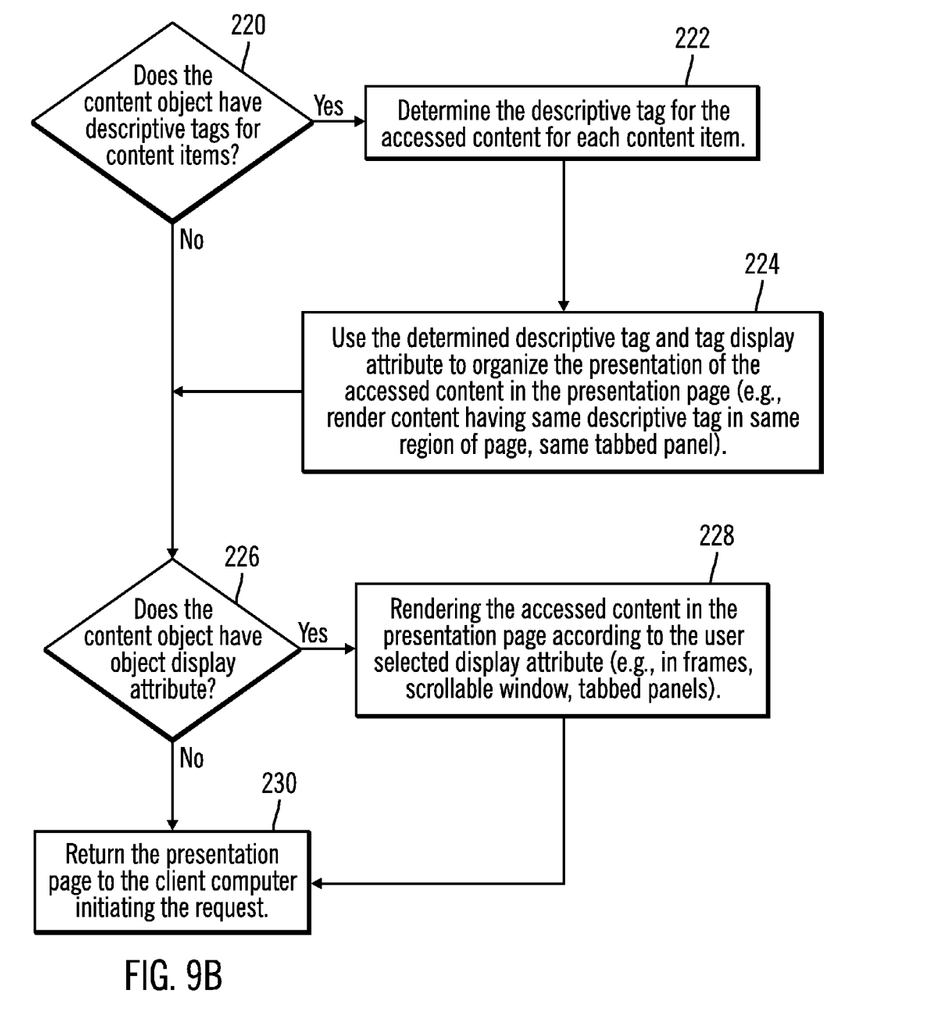

FIGS. 9a and 9b illustrate an embodiment of operations performed by the object manager 18 to process a request from a client 4a, 4b . . . 4n for a content object 12. Upon receiving (at block 200) a user request for the content object from a client computer 4a, 4b . . . 4n the object manager 18 determines (at block 202) whether the access authorization information 50 indicates that the user at the client computer initiating the request has authorization to access the content object. This check may determine whether a username and password provided by the user at the client 4a, 4b . . . 4n matches the fields 54, 56 in an authorization access item 50 of the content object 12. If (at block 202) the user of the client computer 4a, 4b . . . 4n does not have authorization, then a page is returned (at block 204) to the client 4a, 4b . . . 4n indicating access is denied. If (at block 202) the user does have authorization to access, then the object manager 18 generates (at block 206) a presentation page 60, 80.

The object manager then performs a loop (208 through 216) of operations 210-214 for each content item 30 in the content object 12. The object manager accesses (at block 210) the content 14 at the network address 34 of the content item 30, such as by issuing a request to the content system 6a, 6b . . . 6n having the content 14 at the network address 34. The object manager 18 may then select (at block 212) a content type viewer 16 associated with the content type 36, such as a content type viewer 16 capable of rendering the accessed content 14. The content type viewer 16 is used (at block 214) to render the accessed content. The object manager 18 may convert the accessed content rendered by the content type viewer 16 to a common content format, such as TIFF, and the accessed content converted to the common content format is included in the presentation page 60, 80.

In certain embodiments, after rendering the accessed content control proceeds to block 220 in FIG. 9b, where the object manager 18 determines (at block 220) whether the content object 12 has descriptive tags 38 for the content items 30. If so, the object manager 18 determines (at block 222) the descriptive tag 38 for the accessed content 14 for each content item 30 and uses (at block 224) the determined descriptive tag to organize the presentation of the accessed content in the presentation page (e.g., render content having same descriptive tag in same region of page or grouped in frame, such as shown in FIG. 5 or accessed content having same descriptive tag in same tabbed panel, such as shown in FIG. 6). Information on how to render accessed content having a particular descriptive tag 38 may be indicated in the tag display attribute 40 for that tag 38.

If (at block 226) the content object 12 provides an object display attribute 44 for the content object 12 as a whole or display attributes 40 for specific tags 38, then the object manager 18 renders (at block 228) the accessed content in the presentation page 60, 80 according to the object 44 display attribute (e.g., render accessed content associated in frames, e.g., FIG. 5, or grouped in a tab, e.g., FIG. 6, display accessed contents in separate frames, in one window with scrolling, in tabbed frames of content). The generated presentation page 60, 80 with accessed content is returned (at block 230) to the client 4a, 4b . . . 4n to render in the object GUI 20.

Figure 10:
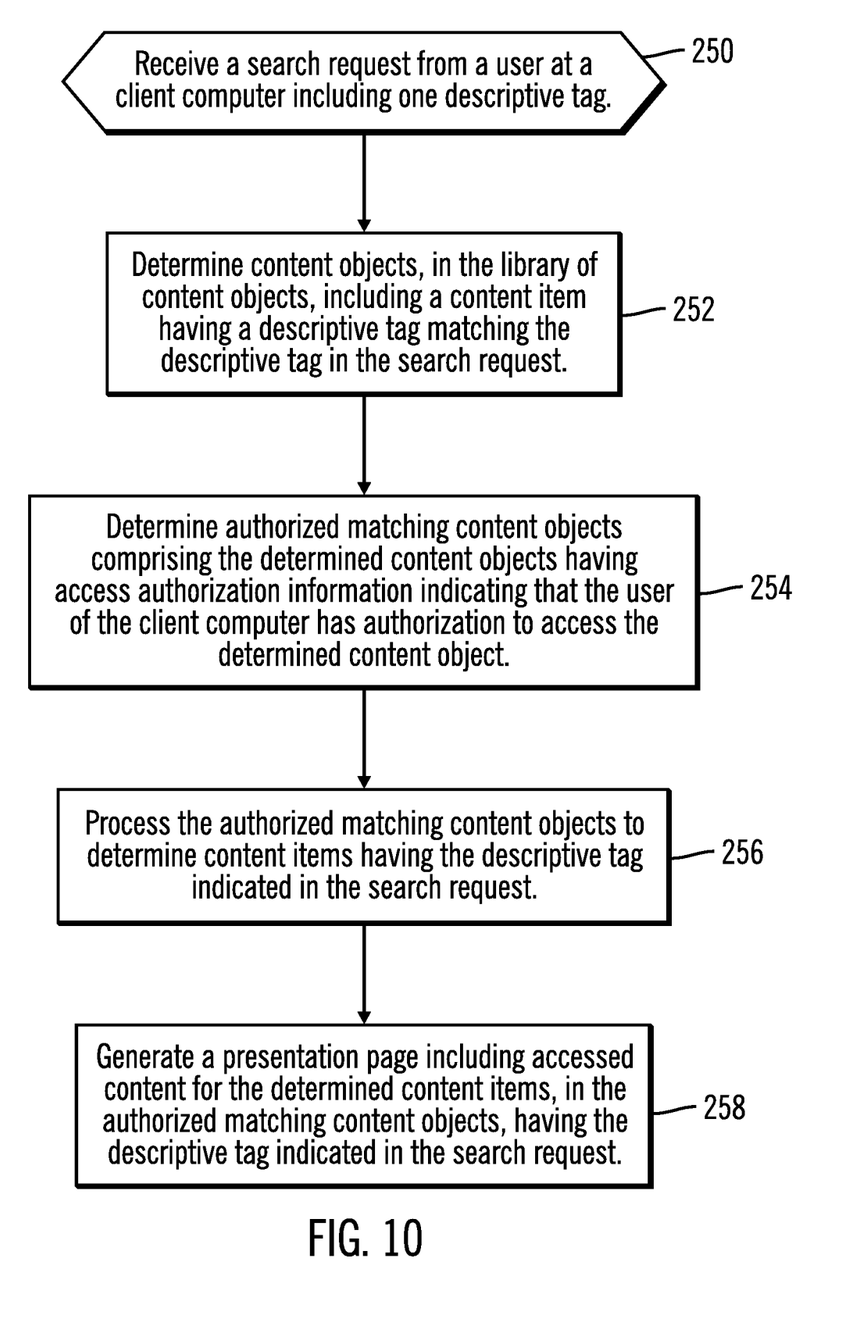
FIG. 10 illustrates an embodiment of operations to process a query for content objects in a content object library.

FIG. 10 illustrates an embodiment of operations performed by the object manager 18 to process a search request from a client 4a, 4b . . . 4n for content items 30 in content objects 12 in the library. Upon receiving (at block 250) a search request from a user at a client computer 4a, 4b . . . 4n including one descriptive tag, or a combination of descriptive tags in a query, the object manager 18 determines (at block 252) content objects 12, in the library of content objects 10, including a content item 30 having a descriptive tag 38 matching the descriptive tag (or query of descriptive tags) in the search request. In one embodiment, the object manager 18 may process the content items 30 encapsulated in the content objects 30 to detect descriptive tags 38 matching the searched descriptive tags. Alternatively, the object manager 18 may maintain an index associating descriptive tags with content objects having those descriptive tags, so that the content objects 12 having descriptive tags matching those in the search request can be determined from the index. The object manager 18 determines (at block 254) authorized matching content objects 12 comprising the determined content objects having access authorization information indicating that the user of the client computer has authorization to access the determined content object, has a username and password matching those 54, 56 in an access authorization item 50 of the authorized matching content objects 12.

The object manager 18 processes (at block 256) the authorized matching content objects to determine content items 30 having the descriptive tag 38 indicated in the search request and then generates (at block 258) a presentation page 60, 80 including accessed content at the network addresses 34 for the determined content items 30, in the authorized matching content objects, having the descriptive tag 38 indicated in the search request.

Described embodiments provide techniques for generating content objects that encapsulate content items describing content accessible over a network and authorization access information to provide security for the object. The content objects allow simple organization of content as content items and provide basic access authorization information to secure the content. Content objects are scalable as any number of content items can be added and can dynamically change. Further, content items can be defined in multiple content objects and accessible by searching the content objects using descriptive tags.

The described content objects provide an implementation of a content space, where the content space is comprised of a set of content and information. The described content object implementation for a content space provides a convenient technique for presenting information to users and for encapsulating information of interest to users and security without significant architecture and hierarchy requirements, such as found in content management systems.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing, or one or more devices or apparatuses, or interconnected devices or apparatuses. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
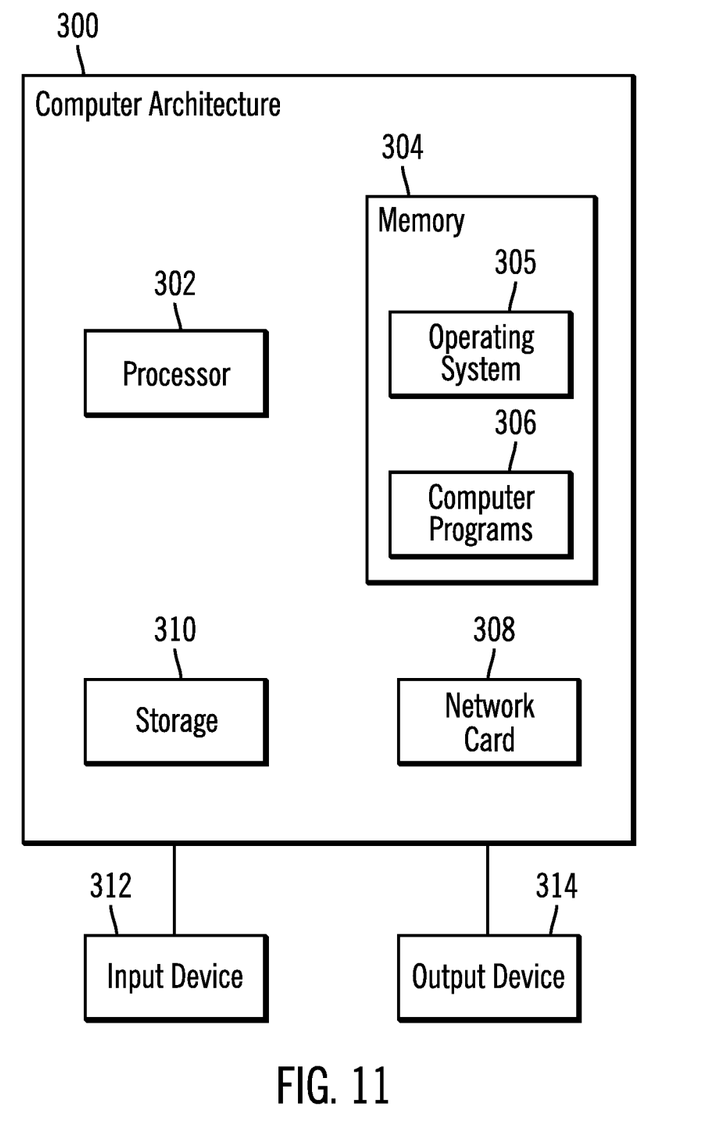
FIG. 11 illustrates an embodiment of a computer architecture.

FIG. 11 illustrates an architecture 300 of a computer system that may be used in accordance with certain embodiments. For instance, the server 2, clients 4a, 4b . . . 4n, and content systems 6a, 6b . . . 6n may be implemented with the computer architecture 300. The computer architecture 300 may implement a processor 302 (e.g., a microprocessor), a memory 304 (e.g., a volatile memory device), and storage 310 (e.g., a non-volatile storage area, such as magnetic disk drives, flash drives, solid state storage drives (SSD), optical disk drives, a tape drive, etc.). An operating system 305 may execute in memory 304. The storage 310 may comprise an internal storage device or an attached or network accessible storage. Computer programs 306 in storage 310 may be loaded into the memory 304 and executed by the processor 302 in a manner known in the art. The architecture further includes a network card 308 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information from the processor 302, or other component, such as a display monitor, printer, storage, etc. The computer architecture 300 of the computer systems may include fewer components than illustrated, additional components not illustrated herein, or some combination of the components illustrated and additional components. The computer architecture 300 may comprise any computing device known in the art, such as a mainframe, server, personal computer, workstation, laptop, handheld computer, telephony device, network appliance, virtualization device, storage controller, etc. Any processor 302 and operating system 305 known in the art may be used.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7, 8, 9a, 9b, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product comprising a computer readable storage device having computer readable program code embodied therein that when executed performs operations, the operations comprising:

receiving a request from a requestor for a content object, wherein the content object includes a plurality of content items, each content item associated with a different corresponding content, wherein each of the content items indicates a network address of a content corresponding to the content item, one or more descriptive tags for the content, each providing a description of the content, a content type to represent different types of content including a video, an image, and a document;

responsive to the request:
  generating a presentation page for the content object;
  accessing the content for each of the plurality of content items using the network address of the content;
  organizing the accessed content, for each of the plurality of content items, based on the one or more descriptive tags for the accessed content, wherein the accessed content for the content items having a same descriptive tag are rendered together as a group in the presentation page, each group being provided within a different frame in the presentation page, wherein at least two different frames corresponding to different groups of content for different descriptive tags are rendered together in the presentation page: and
  providing the presentation page to the requestor for display.

2. The computer program product of claim 1, wherein the operations further comprise:

rendering each of the accessed content using a content type viewer associated with a content type provided for each of the accessed content to render accessed content; and converting the rendered accessed content to a common content format.

3. The computer program product of claim 1, wherein the content object further includes a content object display attribute, and wherein generating the presentation page further comprises rendering each of the accessed content in the presentation page according to the content object display attribute.

4. The computer program product of claim 3, wherein a descriptive tag for at least one of the plurality of content items is associated with a content item display attribute; and wherein generating the presentation page further comprises presenting the accessed content for the at least one of the plurality of content items having the descriptive tag associated with the content item display attribute in the presentation page according to the content item display attribute, wherein the accessed content for each of the content items not having the descriptive tag associated with the content item display attribute are displayed according to the content object display attribute.

5. The computer program product of claim 1, wherein the operations further comprise:

processing access authorization information to determine whether a user at a client computer initiating the request has authorization to access the content object, wherein the presentation page for the content object is generated in response to determining that the user of the client computer is authorized to access the content object, wherein the access authorization information included in the content object includes multiple access authorization items, wherein each access authorization item indicates a requestor name, a password, and an access authorization level, wherein the access authorization level comprises one of owner level access, view only access, and edit and view access.

6. The computer program product of claim 1, wherein at least two network addresses for at least two of the content items are at different content systems in a network, and wherein the content items indicate different content types of content at the network addresses.

7. The computer program product of claim 6, wherein the computer readable program code is included in a web server receiving client requests for content objects from client computers over an Internet, wherein the web server further performs:
    maintaining content objects having content items added by multiple requestors at the client computers over the Internet.

8. The computer readable storage device of claim 1, wherein the operations further comprise:
    building a content object library including a plurality of content objects by performing for each content object:
        receiving content items, wherein each content item indicates a network address and content type;
        adding the content items to a content object;
        receiving access authorization information indicating a user having authority to access the content object; and
        adding the access authorization information to the content object.

9. A computer program product comprising a computer readable storage device having computer readable program code embodied therein that when executed processes transactions directed to a database within a computer system and performs operations, the operations comprising:
    receiving a search request from a requestor including a search descriptive tag to search for at least one content object in a library of content objects, wherein each content object includes a plurality of content items, each content item associated with a different corresponding content, wherein each of the content items in each of the content objects indicates a network address of a content corresponding to the content item, one or more descriptive tags for the content each providing a description of the content, and a content type to represent different types of content including a video, an image, and a document;
    responsive to the search request:
        determining the content objects in the library of content objects including at least one content item having a descriptive tag matching the search descriptive tag;
        generating a presentation page;
        accessing the content for each of the at least one content item having the search descriptive tag using the indicated network address of the content; and
        organizing the accessed content, for each of the plurality of content items, based on the one or more descriptive tags for the accessed content, wherein the accessed content for the content items having a same descriptive tag are rendered together as a group in the presentation page, each group being provided within a different frame in the presentation page, wherein at least two different frames corresponding to different groups of content for different descriptive tags are rendered together in the presentation page; and
    providing the presentation page to the requestor for display.

10. A system, comprising:
    a processor;
    a computer readable storage device including code executed by the processor to perform operations, the operations comprising:
        receiving a request from a requestor for a content object from a requestor, wherein the content object includes a plurality of content items, each content item associated with a different corresponding content, wherein each of the content items indicates a network address of a content corresponding to the content item, one or more descriptive tags for the content, each providing a description of the content, a content type to represent different types of content including a video, an image, and a document;
        responsive to the request:
            generating a presentation page for the content object;
            accessing the content for each content item of the plurality of content items using the indicated network address of the content;
            organizing the accessed content, for each of the plurality of content items, based on the one or more descriptive tags for the accessed content, wherein the accessed content for the content items having a same descriptive tag are rendered together as a group in the presentation page, each group being provided within a different frame in the presentation page, wherein at least two different frames corresponding to different groups of content for different descriptive tags are rendered together in the presentation page; and
            providing the presentation page to the requestor for display.

11. The system of claim 10, wherein the content object further includes a content object display attribute, and wherein generating the presentation page further comprises rendering each of the accessed content in the presentation page according to the content object display attribute.

12. The system of claim 11, wherein a descriptive tag for at least one of the plurality of content items is associated with a content item display attribute; and
    wherein generating the presentation page further comprises presenting the accessed content for the at least one of the plurality of content items having the descriptive tag associated with the content item display attribute in the presentation page according to the content item display attribute, wherein the accessed content for each of the content items not having the descriptive tag associated with the content item display attribute are displayed according to the content object display attribute.

13. The system of claim 10, wherein at least two network addresses for at least two of the content items are at different content systems in a network, and wherein the content items indicate different content types of content at the network addresses.

14. The system of claim 10, wherein the operations further comprise:
    rendering each of the accessed content using a content type viewer associated with a content type provided for each of the accessed content to render accessed content; and converting the rendered accessed content to a common content format.

15. The system of claim 10, wherein the operations further comprise:
    processing access authorization information to determine whether a user at a client computer initiating the request has authorization to access the content object, wherein the presentation page for the content object is generated in response to determining that the user of the client computer is authorized to access the content object, wherein the access authorization information included in the content object includes multiple access authorization items, wherein each access authorization item indicates a requestor name, a password, and an access authorization level, wherein the access authorization level comprises one of owner level access, view only access, and edit and view access.

16. The system of claim 13, wherein the code is included in a web server receiving client requests for content objects from client computers over an Internet, wherein the web server further performs:
    maintaining content objects having content items added by multiple requestors at the client computers over the Internet.

17. The system of claim 10, wherein the operations further comprise:
    building a content object library including a plurality of content objects by performing for each content object:
        receiving content items, wherein each content item indicates a network address and content type;
        adding the content items to a content object;
        receiving access authorization information indicating a user having authority to access the content object; and
        adding the access authorization information to the content object.

18. A system in communication with a client computer over a network, comprising:
    a processor;
    a computer readable storage device including code executed by the processor to perform operations, the operations comprising:
        receiving a search request from a requestor including a search descriptive tag to search for at least one content object in a library of content objects, wherein each content object includes a plurality of content items each content item associated with a different corresponding content, wherein each of the content items indicates a network address of a content corresponding to the content item, one or more descriptive tags for the content each providing a description of the content, and a content type capable to represent different types of content including a video, an image, and a document;
        responsive to the search request:
            determining content objects in the library of content objects including at least one content item having a descriptive tag matching the search descriptive tag;
            generating a presentation page;
            accessing the content for each of the at least one content item having the search descriptive tag using the indicated network address of the content; and
            organizing the accessed content, for each of the plurality of content items, based on the one or more descriptive tags for the accessed content, wherein the accessed content for the content items having a same descriptive tag are rendered together as a group in the presentation page, each group being provided within a different frame in the presentation page, wherein at least two different frames corresponding to different groups of content for different descriptive tags are rendered together in the presentation page; and
            providing the presentation page to the requestor for display.

* * * * *